US011558601B2

(12) United States Patent
Swope et al.

(10) Patent No.: US 11,558,601 B2
(45) Date of Patent: Jan. 17, 2023

(54) METHODS AND APPARATUS FOR INITIALIZING OBJECT DIMENSIONING SYSTEMS

(71) Applicant: SYMBOL TECHNOLOGIES, LLC, Lincolnshire, IL (US)

(72) Inventors: Charles Burton Swope, Coral Springs, FL (US); Matthew Hayes, Wheaton, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 831 days.

(21) Appl. No.: 15/805,119

(22) Filed: Nov. 6, 2017

(65) Prior Publication Data
US 2019/0141308 A1 May 9, 2019

(51) Int. Cl.
| | | |
|---|---|---|
| H04N 13/32 | (2018.01) | |
| H04N 13/00 | (2018.01) | |
| H04N 13/296 | (2018.01) | |
| H04N 13/15 | (2018.01) | |
| H04N 13/167 | (2018.01) | |
| H04N 13/189 | (2018.01) | |
| H04N 13/204 | (2018.01) | |
| H04N 5/232 | (2006.01) | |
| G01B 11/00 | (2006.01) | |

(52) U.S. Cl.
CPC ........... *H04N 13/296* (2018.05); *G01B 11/00* (2013.01); *H04N 5/232* (2013.01); *H04N 13/15* (2018.05); *H04N 13/167* (2018.05); *H04N 13/189* (2018.05); *H04N 13/204* (2018.05)

(58) Field of Classification Search
CPC .......... G01S 7/51; G01S 17/89; G01S 7/4915; G01S 7/4817; G01B 11/245; G01B 11/04; G01B 11/02; G01B 11/00; B66F 9/07504; B66F 9/0755; G01G 19/083; G06Q 50/28; H04N 13/296; H04N 13/15; H04N 13/167; H04N 13/189; H04N 13/204; H04N 5/232
See application file for complete search history.

(56) References Cited

U.S. PATENT DOCUMENTS

| | | |
|---|---|---|
| 7,385,525 B2 | 6/2008 | Ho et al. |
| 2002/0080879 A1 | 6/2002 | Setoguchi et al. |
| 2004/0118921 A1 | 6/2004 | Breytman et al. |

(Continued)

OTHER PUBLICATIONS

International Search Report and Written Opinion for International Application No. PCT/US2018/055658 dated Feb. 22, 2019.

*Primary Examiner* — Alazar Tilahun

(57) ABSTRACT

Methods, systems, and apparatus for initializing a dimensioning system based on a location of a vehicle carrying an object to be dimensioned. An example method disclosed herein includes receiving, from a location system, location data indicating a location of a vehicle carrying an object; responsive to the location data indicating that the vehicle is approaching an imaging area, initializing, using a logic circuit, a sensor to be primed for capturing data representative of the object; receiving, from a motion detector carried by the vehicle, motion data indicating a speed of the vehicle; and triggering, using the logic circuitry, the sensor to capture data representative of the object at a sample rate based on the speed of the vehicle.

13 Claims, 11 Drawing Sheets

(56) References Cited

U.S. PATENT DOCUMENTS

| | | | |
|---|---|---|---|
| 2005/0280533 A1* | 12/2005 | Yao | A61B 5/1072 |
| | | | 340/552 |
| 2010/0076902 A1* | 3/2010 | Kraft | G06K 17/0022 |
| | | | 705/333 |
| 2012/0194718 A1* | 8/2012 | Sato | H04N 5/357 |
| | | | 348/301 |
| 2012/0303176 A1* | 11/2012 | Wong | G01S 17/89 |
| | | | 701/1 |
| 2015/0022669 A1 | 1/2015 | Hall | |
| 2015/0032292 A1 | 1/2015 | Stratton | |
| 2017/0227629 A1* | 8/2017 | Sorensen | G01G 19/083 |

* cited by examiner

METHODS AND APPARATUS FOR INITIALIZING OBJECT DIMENSIONING SYSTEMS

FIELD OF THE DISCLOSURE

This disclosure relates generally to dimensioning systems and, more particularly, to methods, systems and apparatus for initializing a dimensioning system based on a location of a vehicle carrying an object to be dimensioned.

BACKGROUND

Transportation and logistics systems include planning operations that improve efficiency and accuracy of certain delivery services. For example, when a plurality of objects (e.g., packages) are going to be loaded into a container (e.g., delivery trucks), a transportation and logistics system may determine which objects are to be transported via which container and how the objects are to be loaded into the containers. Such systems are better able to execute the planning operations by gaining knowledge of one or more dimensions of the objects to be transported.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
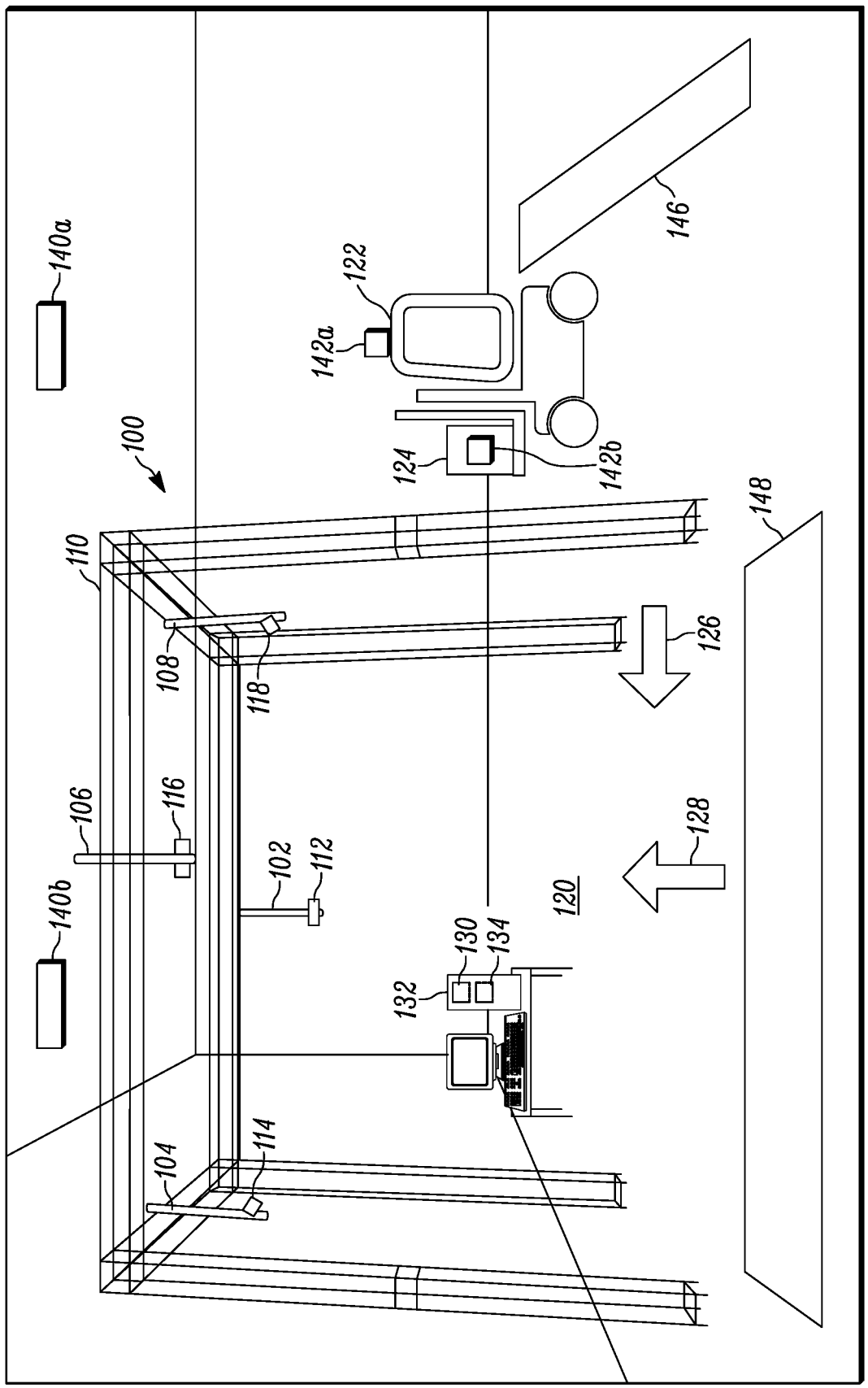
FIG. 1 depicts an example environment including an example "all-at-once" object dimensioning system constructed in accordance with teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments disclosed herein.

The apparatus and method components have been represented where appropriate by conventional symbols in the drawings, showing only those specific details that are pertinent to understanding the embodiments disclosed herein so as not to obscure the disclosure with details that will be readily apparent to those of ordinary skill in the art having the benefit of the description herein.

DETAILED DESCRIPTION

Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate and timely performance.

To meet these and other challenges, transportation and logistics entities seek improvements across different aspect of various operations. For example, the process of loading packages into containers (e.g., delivery truck trailers) includes determining which packages should be loaded into which containers, determining a preferred spatial arrangement of the packages in the containers, communicating data to loaders (e.g., persons or machines tasked with physically placing the packages into the containers), and tracking information related to the packages being loaded. Some of these operations involve determining or obtaining one or more characteristics of the packages such as, for example, a weight of a package, a shape of package, and/or one or more dimensions of a package. The process of measuring or obtaining one or more dimensions of an object, such as a package, is sometimes referred to as dimensioning.

However, dimensioning each package to be loaded into a container consumes valuable time. To reduce the time taken to dimension packages, some systems utilizes machines, such as scanners or imagers, to obtain measurements. In known systems that utilize machines to obtain measurements, packages to be imaged or scanned are stationary and isolated from other objects due to challenges and complexities associated with object to be dimensioned being proximate (e.g., abutting or resting on) other objects (e.g., forks of a forklift). Such known systems incur additional time and resource consumption in connection with isolating the packages from other objects before being dimensioned.

Example methods, systems, and apparatus disclosed herein provide efficient and accurate dimensioning of an object while the object is being carried by a vehicle, such as a forklift. While applicable in any suitable environment, examples disclosed herein enhance systems that employ image sensors to generate, for example, color data and depth data representative of a scene including the vehicle and the object to be dimensioned. As described in detail below, examples disclosed herein can be utilized in any suitable arrangement and/or configuration of image sensors. In some systems referred to as "all-at-once" arrangements, multiple image sensors are each configured to capture image data representative of the dimensioning area in a time-coordinated manner. In such "all-at-once" arrangements, image data from one of the image sensors corresponds to a corresponding perspective of the scene. Images from multiple perspectives of the scene are combined (e.g., merged) to form a complete representation (i.e., three-hundred sixty degree view) of the scene and, thus, the object to be dimensioned. In some systems referred to as "incremental" arrangements, a single image sensor is configured to capture multiple instances of image data as the vehicle moves through (e.g., forward, backward, and/or about one or more pivot points) an area covered by the image sensors. In such "incremental" arrangements, image data from the different instances of image data are combined (e.g., merged) to form a complete representation of the scene and, thus, the object to be dimensioned. Additional or alternative arrangements and/or configurations of image sensors are possible and example methods and apparatus disclosed herein may be utilized in any suitable system. It should be appreciated that "all-at-once" and "incremental" arrangements are not exclusive of one another. To this end, the techniques described herein with respect to an "incremental" arrangement may be applied to each individual camera of an "all-at-once" arrangement.

Environments in which the image sensors are deployed are often hectic and time-sensitive, with vehicles rapidly approaching and leaving the field of view of the image sensors, which is referred to as an imaging area. In such environments, workflows may be detrimentally interrupted if vehicles are required to, for example, wait or slow down for the system (e.g., for the image sensor to warm up) or if an image capture process must be repeated. Such interruptions are impactful, especially in time-critical enterprises. Known systems wait for the vehicle to enter the imaging area before executing a data capture process. In contrast to these known systems, examples disclosed herein initialize the image sensors prior to the vehicle and the object arriving in the imaging area. Examples disclosed herein provide advanced detection of an upcoming image capture process based on, for example, movement (e.g., heading and/or speed) and/or location of the vehicle carrying the object to be dimensioned. Upon detection of the upcoming image capture process, examples disclosed herein enable the image sensors (and/or associated equipment) to be in a state of readiness prior to the arrival of the vehicle at the imaging area. Put another way, examples disclosed herein provide early detection of an upcoming dimensioning event and initialize the dimensioning system to a state of readiness.

Initialization of the image sensors disclosed herein includes, for example, coordinating image capture timing between multiple image sensors (of an "all-at-once" arrangement) by synchronizing clocks of the respective image sensors based on the movement and/or location (e.g., distance away from the image sensors) of the vehicle on approach to the imaging area. Because the image data from the different image sensors are merged to create a full view of the scene, having the clocks of the image sensors synchronized improves the quality of the merged image data.

Additionally or alternatively initialization of the images sensors disclosed herein includes, for example, determining and setting a sample rate (of an "incremental" arrangement) at which to capture image data based on movement (e.g., speed) and/or location of the vehicle. By setting the sample rate according to, for example, the speed of the vehicle, example disclosed herein adapt the system to real-time conditions in which a faster moving vehicle may require more samples than a slower moving vehicle.

Additionally or alternatively, initialization of the image sensors disclosed herein includes, for example, causing the image sensors to allocate memory (e.g., high speed cache memory) in preparation of receiving captured image data and/or clearing a buffer configured to store captured image data. In some instances, large amounts of data are generated by the image sensors, such as when an irregularly shaped object or a large object is carried by the vehicle. Examples disclosed herein determine that a slow moving vehicle is an indication that such an object is approaching the imaging area and, in response, allocate additional memory and/or reserve high speed memory for the upcoming task.

Additionally or alternatively, initialization of the image sensors disclosed herein includes, for example, performing a recalibration routine in preparation for the arrival of the vehicle such that all of the image sensors are properly configured before the vehicle arrives. By recalibrating the image sensors prior to the arrival of the vehicle in the imaging area, examples disclosed herein reduce or eliminate instances in which the vehicle is required to wait for the system to calibrate.

Additionally or alternatively, examples disclosed herein recognize that some image sensors need to operate at a certain temperature to achieve full potential in terms of performance metrics. As an example, the image sensors may generate lower resolution and/or blurrier images when operating below the certain temperature. Accordingly, the determined dimensions of objects represented by the image data are less accurate. To save energy, such image sensors may operate at a standby temperature when not in use and, thus, require a warm up procedure before the image sensor can operate at full potential. As such, examples disclosed herein trigger a warm-up process of the image sensors based on movement and/or location of the vehicle prior to the vehicle entering the field of view of the image sensor(s), thereby providing the image sensors with sufficient time to fully reach the operating temperature. Put another way, known systems wait for the vehicle to enter the imaging area before waking up the image sensors. In contrast, examples disclosed herein provide advanced detection of an upcoming image capture process based on movement and/or location of the vehicle and enable the image sensors (and/or associated equipment) to be at full operating potential prior to the arrival of the vehicle at the imaging area.

While the foregoing explains challenges associated with package loading and delivery, similar challenges exist in other environments and applications that involve a need for accurate and efficient image capture processes. For example, inventory stocking operations and warehouse management operations suffer when objects are not accurately placed in assigned locations. Further, while example methods, systems and apparatus disclosed herein are described below in connection with package loading operations at a loading dock, example methods, systems and apparatus disclosed herein can be implemented in any other suitable context or environment such as, for example, a warehouse, a retail establishment, an airport, a train loading location, or a shipping port. Moreover, while the following describes a forklift and the process of dimensioning packages being carried by a forklift, example methods, systems, and apparatus disclosed herein are applicable to additional or alternative types of objects and/or additional or alternative types of carriers (e.g., containers, persons carrying object(s), and/or different types of vehicles).

FIG. 1 illustrates an example environment in which example methods, systems and apparatus disclosed herein may be implemented. The example of FIG. 1 illustrates a loading dock including an "all-at-once" dimensioning system 100 constructed in accordance with teachings of this disclosure. While FIG. 1 illustrates a loading dock environment, the described dimensioning techniques are also applicable to in-lane loading environments. The example "all-at-once" dimensioning system 100 of FIG. 1 includes a north imaging station 102, a west imaging station 104, a south imaging station 106 and an east imaging station 108. The imaging stations 102-108 of FIG. 1 are mounted to a frame 110. Alternative examples include any suitable number (e.g., three (3) or five (5)) of imaging stations deployed in any suitable manner (e.g., mounted to walls or a ceiling). The terms "north," "west," "south" and "east" are used for ease of reference and not limitation. Each of the imaging stations 102-108 of FIG. 1 includes an image sensor 112-118, respectively, capable of capturing color data and depth data in a respective coordinate system. For example, each of the image sensors 112-118 is an RGB-D sensor (e.g., a Kinect® sensor) that generates an RGB value and a depth value for each pixel in a coordinate system. In alternative examples, each of the imaging stations 102-108 includes a three-dimensional (3D) image sensor that provides depth data and a separate two-dimensional (2D) image senor that provides color data. In such instances, the 2D image sensor is registered to the coordinate system of the partner 3D image sensor, or vice versa, such that the color data of each pixel is associated with the depth data of that pixel.

Each of the image sensors 112-118 of FIG. 1 are pointed toward an imaging area 120. Each of the image sensors 112-118 is tilted (e.g., at a forty-five (45) degree angle toward a floor of the imaging area 120. As such, each of the image sensors 112-118 generate color data and depth data representative of the imaging area 120. When a vehicle 122 carrying an object 124 enters the imaging area 120 of FIG. 1, the image sensors 112-118 simultaneously generate color data and depth data representative of the image area 120, including the vehicle 122 and the object 124 from the different perspectives. Hence, the name "all-at-once."

In the example of FIG. 1, the vehicle 122 is a forklift and the object 124 is a package to be dimensioned by the dimensioning system 100. For example, the vehicle 122 may be in the process of moving the object 124 from a warehouse location to a trailer or other type of container associated with the loading dock illustrated in FIG. 1. In the illustrated example, vehicles can enter the imaging area 120 in a first direction 126 or a second direction 128. However, any suitable number of directions are possible depending on, for example, surrounding environmental arrangement of the loading dock. As illustrated in FIG. 1, the vehicle 122 is entering the imaging area 120 in the first direction 126, which is towards the west imaging station 114.

To efficiently and accurately dimension the object 124 being carried by the vehicle 122 without interrupting movement of the vehicle 122 and without requiring removal of the object 124 from the vehicle 122, the example "all-at-once" dimensioning system 100 of FIG. 1 includes a freight dimensioner 130 constructed in accordance with teachings of this disclosure. In the illustrated example of FIG. 1, the freight dimensioner 130 is implemented on a processing platform 132 deployed at the loading dock. However, the example freight dimensioner 130 disclosed herein may be implemented in any suitable processing platform such as, for example, a processing platform deployed on the vehicle 122 and/or a mobile processing platform carried by a person associated with the vehicle 122 or, more generally, the loading dock. An example implementation of the processing platform 132 described below in connection with the FIG. 12.

To initialize one or more components of the dimensioning system 100 (e.g., the image sensors 112-118 and/or memory of the processing platform 132) in advance of the vehicle 122 arriving at the imaging area 120 in accordance with teachings of this disclosure, the freight dimensioner 130 of FIG. 1 detects the upcoming arrival and initializes the one or more components according to one or more aspects of the detected upcoming arrival. In the example of FIG. 1, the freight dimensioner 130 is in communication with one or more vehicle detection systems that provide data indicative of movement (e.g., a heading and/or speed) and/or location (e.g., a coordinate) of the vehicle 122. For example, the processing platform 132 of FIG. 1 is in communication with an RFID-based location system. The example RFID-based location system locates RFID tags 142a and 142b affixed to the vehicle 122 and the object 124, respectively. To perform the locationing, RFID readers 140a and 140b detect signals emitted by the RFID tags 142a and 142b and perform calculations based on the signals and the known locations of the RFID readers 140a and 140b to determine a location of the vehicle 122 and a location of the object 124. In some examples, the RFID readers are Advanced Array Reader (AAR) RFID readers.

The RFID-based locationing system of FIG. 1, or an alternatively type of locationing system (e.g., a LIDAR locationing system), provides location information to the freight dimensioner 130 (e.g., via a wireless communication link). In some examples, the location information includes coordinates of the corresponding item (e.g., the vehicle 122 or the object 124 by association with the respective RFID tag 142a and 142b).

As described in detail below, the example freight dimensioner 130 of FIG. 1 establishes one or more initialization thresholds for triggering one or more initialization processes. In some examples, one or more of the initialization thresholds may be for a location of the vehicle 122 and/or a location of the object 124. When the example freight dimensioner 130 of FIG. 1 obtains data indicating that the vehicle 122 and/or the object 124 has met an initialization threshold (e.g., by entering a designated area), the freight dimensioner 130 initializes the image sensors 112-118 (e.g., by synchronizing the timing between the image sensors 112-118, by warming up the sensors 112-118, and/or by allocating and/or clearing memory associated with the image sensors 112-118). The example freight dimensioner 130 of FIG. 1 establishes initialization thresholds in multiple directions with respect to imaging area 120. For example, the freight dimensioner 130 establishes a westbound initialization threshold 146 for vehicles traveling in the west direction 126 (i.e., toward the "west" imaging station 104) and a north bound initialization threshold 148 for vehicles traveling in the north direction 128 (i.e., toward the "north" imaging station 106). In the illustrated example, the vehicle 122 has already crossed the westbound initialization threshold 146. Notably, the initialization thresholds set by the example freight dimensioner 130 correspond to locations positioned in advance of the imaging area 120. By designating areas surrounding the imaging area 120 by a distance and initializing component(s) according to those areas, the components are afforded sufficient time to properly initialize (e.g., arrive at an operating temperature, prepare memory to increase the speed at which data can be processed, and/or synchronize timing of data capture).

As described in detail below, the example freight dimensioner 130 of FIG. 1 is in communication with a movement detection system that provides information indicative of the movement of the vehicle 122. As described in detail below, the example freight dimensioner 130 uses the movement information to perform one or more initializations and/or to determine one or more setting values associated with image capture processes.

Figure 2:
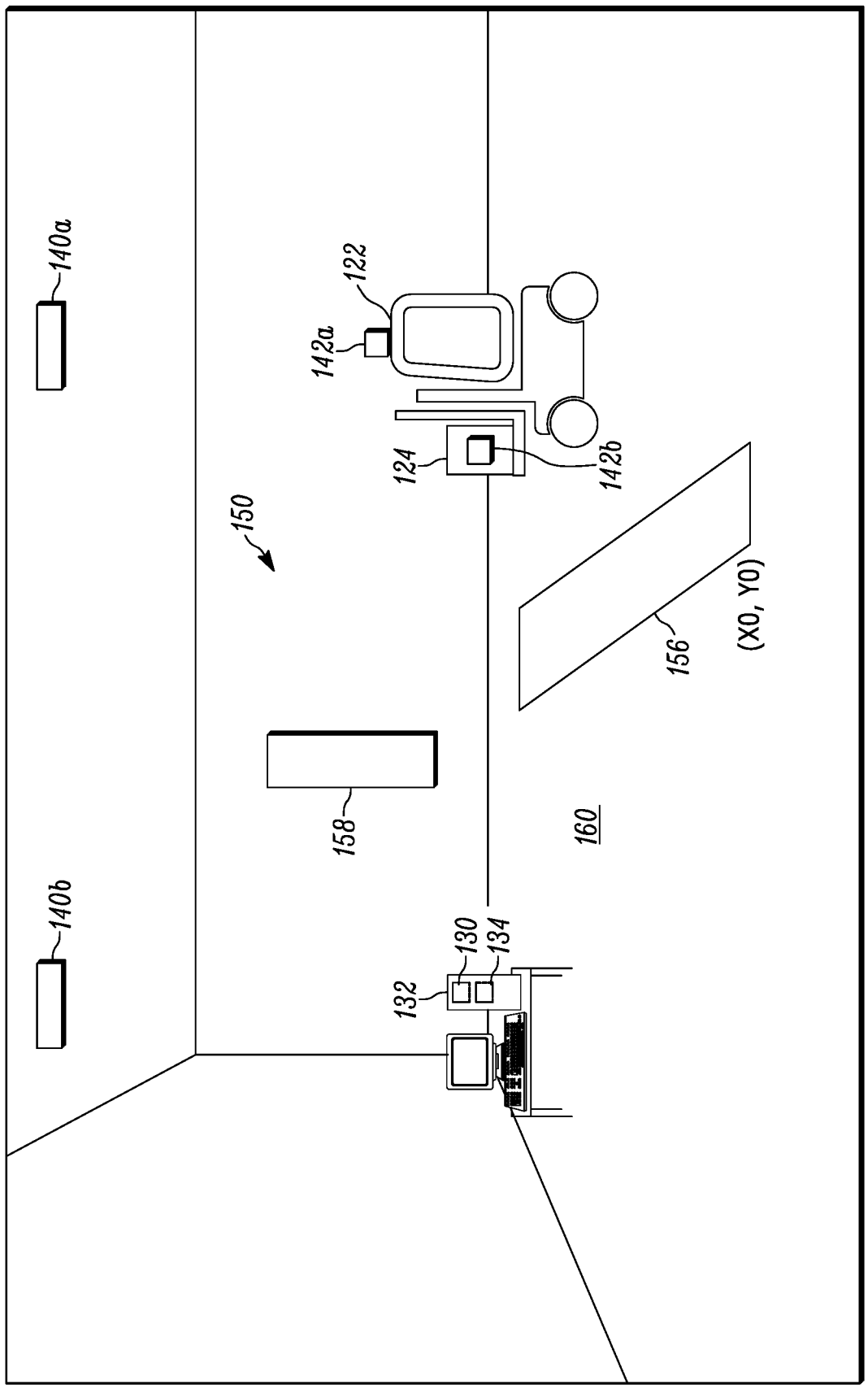
FIG. 2 depicts an example environment including an example "incremental" object dimensioning system constructed in accordance with teachings of this disclosure.

FIG. 2 illustrates another example environment in which example methods, systems and apparatus disclosed herein may be implemented. The example of FIG. 2 is representative of a loading dock including an "incremental" dimensioning system 150 constructed in accordance with teachings of this disclosure. The example "incremental" dimensioning system 100 of FIG. 1 includes an image sensor 158. Like the image sensors 112-118, the image sensor 158 is an RGB-D sensor that generates an RGB value and a depth value for each pixel in a coordinate system. The example image sensor 158 is directed at an imaging area 160. When the vehicle 122 carrying the object 124 enters the imaging area 160, the image sensor 158 captures sets of RGB-D data repeatedly at a determined sample rate. The example freight dimensioner 130 of FIG. 2 stitches the sets of RGB-D data together to generate a merged image representative of the imaging area 160. Hence, the term "incremental." The image sensor 158 of FIG. 2 provides captured image data to the processing platform 132, which includes the example freight dimensioner 130 described above in connection with FIG. 1.

Like the system of FIG. 1, the freight dimensioner 130 utilizes location information indicative of a location of the vehicle 122 to, for example, initialize one or more components of the system. In the illustrated example, the freight dimensioner 130 receives location information from an RFID-based location system similar to the RFID-based system of FIG. 1. Moreover, like the example of FIG. 1, the example freight dimensioner 130 of FIG. 2 establishes an initialization threshold 156 for use with the received location information. When the freight dimensioner 130 determines that the vehicle 122 and/or the object 124 has crossed the initialization threshold 156, the freight dimensioner 130 initializes the image sensor 158 by determining a sample rate based on a speed at which the vehicle 122 is traveling. Examples disclosed herein obtain speed information from the location system and/or, as described in detail below, a motion unit associated with the vehicle 122. In some examples, the location of the vehicle 122 and/or the object 124 is utilized to cease the capturing of image data by the image sensor 158. For example, when the freight dimensioner 130 receives location data indicating that the vehicle 122 and/or the object 124 has left the imaging area 160, the freight dimensioner 130 may send a command to the image sensor 158 causing the image sensor 158 to cease capturing image data.

In various embodiments, the imaging area 160 is associated with a coordinate system. In the illustrated example, the coordinate system is a two-dimensional coordinate system with an axis defined by the initialization threshold 156. Accordingly, the freight dimensioner 130 determines the coordinates of the vehicle 122 and/or the object 124 as the vehicle 122 traverses the image area 160. As described herein, the freight dimensioner 130 utilizes the coordinates of the vehicle 122 and/or the object 124 to combine successive sets of image data captured by the image sensor 158 into a composite image.

Figure 3:
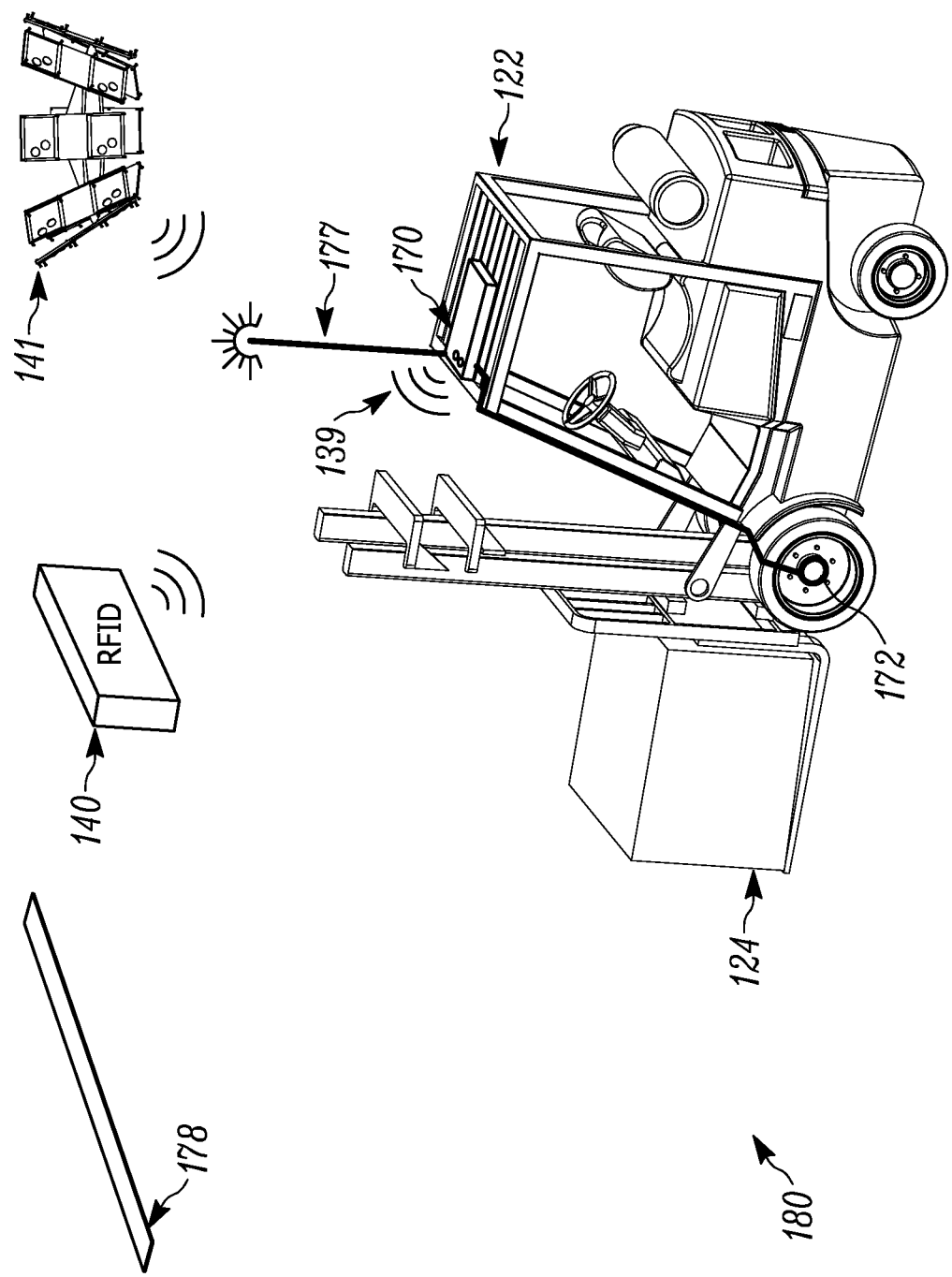
FIG. 3 is an example environment that illustrates a location system that may be implemented in the environments of FIG. 1 or 2.

FIG. 3 is an example environment 180 that illustrates a movement detection system that may be implemented in the environments 100 and 150. Data indicative of the movement of the vehicle 122 is sometimes referred to herein as telematics data. In the example of FIG. 3, the vehicle 122 carrying the object 124 includes a telematics unit 170 affixed to an upward-facing surface of the vehicle 122. The telematics unit 170 of FIG. 3 is implemented by an inertial motion unit (IMU). In the illustrated example, the telematics unit 170 is in communication with an encoder 172 affixed to a wheel of the vehicle 122. The telematics unit 170 determines a speed at which the vehicle 122 is traveling by measuring a change in rotational orientation of the wheel of the vehicle 122 via the encoder 172. The encoder 172 generates a tick each time the wheel rotates a fixed amount. For example, if the encoder 172 is set to generate 360 ticks per rotation, the encoder 172 generates a tick each time the wheel rotates 1°. As the radius of the wheel is a generally known value, the distance traveled by the vehicle 122 is readily determined by calculating the length of the arc between each tick.

Although embodiments described herein define a tick based on the rotation of a wheel of the vehicle 122, other techniques to generate ticks are also envisioned. For example, the telematics unit 170 of the vehicle 122 may include a vertically oriented image sensor to detect a pattern of markings on the ceiling of the warehouse. In this example, a tick may occur each time the vertically-oriented image sensor detects a predetermined marking.

In some examples, the telematics unit 170 obtains telematics data from additional or alternate sensors affixed to the vehicle 122. For example, the telematics unit 170 can include one or more potentiometers to determine a heading of travel. As described in detail below, the telematics unit 170 provides the telematics data to the freight dimensioner 130, which uses the telematics unit to, for example, set and/or control a sample rate of the image sensor 158. For example, the heading data can indicate a distance traveled using the coordinate system of imaging area 160. To this end, the freight dimensioner 130 uses the heading information to divide the distance traversed by the vehicle 122 each tick into a distance traversed in the X-orientation and a distance traversed in the Y-orientation.

In the example of FIG. 3, the telematics unit 170 also includes one or more transceivers for communicating with one or more locationing systems. In the illustrated embodiment, the example telematics unit 170 supports both LIDAR and RFID locationing. Alternate telematics units may support only a single locationing technique. To support RFID locationing, the example telematics unit 170 may include an RFID tag, such as the RFID tag 142a. The RFID tag may emit an RFID signal 139 detected by the RFID reader 140 and/or an AAR RFID reader 141. Based on the signal detected by the RFID reader 140 and/or the AAR RFID reader 141, and known RFID locationing techniques, the telematics unit 170 and/or the processing platform 132 generates location data indicative of a current location of the vehicle 122. As explained above, the location of the vehicle 122 relative to one or more initialization thresholds may trigger one or more initializations of the dimensioning system component(s). For example, in response to the telematics unit 170 determining that the vehicle 122 crossed an initialization threshold, thereby indicating an upcoming or imminent arrival of the vehicle 122 in the imaging area 160, the freight dimensioner 130 (which is in communication with the telematics unit 170) initializes the image sensor 158 (e.g., warms up by awakening from a standby mode and/or sets a sample rate based on the speed of the vehicle 122).

To support LIDAR locationing, the example telematics unit 170 of FIG. 3 includes a LIDAR range finder that produces a vertically-oriented LIDAR laser beam 177. When the LIDAR laser beam 177 strikes a LIDAR trigger bar 178, the LIDAR location system determines that vehicle 122 is underneath the LIDAR trigger bar 178. In some examples, more than one LIDAR trigger bar is utilized such that a direction of travel is determinable. Accordingly, the LIDAR trigger bar 178 (and any other LIDAR trigger bars) is positioned such that the LIDAR laser beam 177 strikes the LIDAR trigger bar 178 when the vehicle 122 and/or the object 124 enters the imaging area 160. In the example of FIG. 3, the LIDAR trigger 178 is used to start an image data capture operation. In some embodiments, another LIDAR trigger bar (not depicted) may be located such that the LIDAR laser beam 177 strikes the other LIDAR trigger bar when the vehicle 122 and/or the object 124 exits the imaging area 160, thus causing the freight dimensioner 130 to cease the image data capture operation.

As noted above, the example telematics unit 170 obtains movement information associated with the vehicle 122 via, for example, the encoder 172 affixed to a wheel of the vehicle 122. The information provided by the encoder 172 is used by the freight dimensioner 130 to set and/or control, for example, the image capture rate of one or more images sensors.

Figure 4:
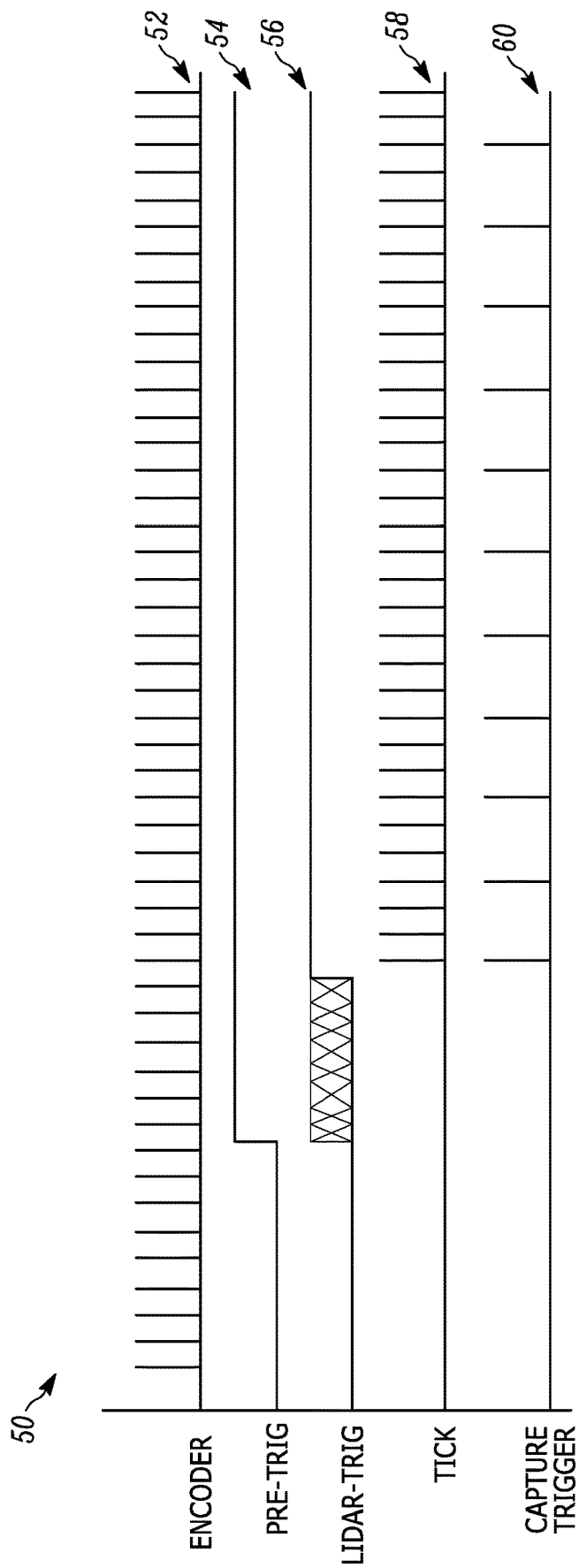
FIG. 4 illustrates an example timing diagram representative of an example "incremental" dimensioning system as implemented by the freight dimensioner 130 of FIG. 1 or 2.

FIG. 4 illustrates an example timing diagram 50 representative of the setting and/or controlling of the image capture rate executing by the example freight dimensioner 130 based on the encoder 172 of FIG. 3. To this end, the encoder line 52 represents each tick generated by the encoder 172. As described herein, location systems generally determine the location of tracked objects on a periodic basis. In some embodiments, the location system relies on the encoder 172 to set the rate at which the location of tracked objects are determined. In some embodiments, the location system determines the location of an object in response to each encoder tick. Aligning the time at which the image sensor 158 captures image data with an encoder tick increases the accuracy of the dimensioning by mitigating errors introduced through a misalignment between the position and time of the vehicle 122 and/or the object 124 as determined by the location system and the position and time of the vehicle 122 and/or the object 124 as inferred from captured image data. As a result, the vehicle 122 may be able to pass through the dimensioning zone 160 at faster speeds while still obtaining accurate dimensions of the vehicle 122 and/or the object 124.

The illustrated Pre-Trig line 54 represents when the vehicle 122 has crossed an initialization threshold, such as the initialization threshold 156. As described herein, the freight dimensioner 130 detects the crossing of the initialization threshold through the use of RFID location techniques and/or any other suitable locationing technique. In the illustrated scenario, the line for the Pre-Trig line 54 switches from low to high in response to the freight dimensioner 130 detecting, for example, that an RFID response beam generated by the telematics unit 170 indicates that the vehicle 122 and/or the object 124 has crossed the initialization threshold.

The illustrated LIDAR-Trig line 56 represents when the vehicle 122 has reached a location associated with a LIDAR trigger bar, such as the LIDAR trigger bar 178 that triggers the data capture process. As described herein, the LIDAR trigger bar 178 is located to detect when the vehicle 122 has entered the imaging area 160. Accordingly, the line for the LIDAR-Trig line 56 switches from low to high in response to detecting that a LIDAR laser beam, such as the LIDAR laser beam 177, has struck the LIDAR trigger bar 178.

The shaded area on the LIDAR-Trig line 56 represents the time during which the freight dimensioner 130 is initializing one or more components of the dimensioning system. For example, the shaded area on the LIDAR-Trig line 56 represents the time during which an image sensor is warming up to an operating temperature and/or being recalibrated. In some examples, the shaded area on the LIDAR-Trig line 56 represents the time during which clocks of different image sensors (e.g., in an "all-at-once" arrangement) are synchronized.

In some embodiments, the initialization process includes coordinating timing circuitry at the image sensor 158 with the encoder 172. Accordingly, as illustrated on the Tick line 58, the encoder 172 begins transmitting encoder ticks to the freight dimensioner 130. Although FIG. 4 illustrates the ticks on lines 52 and 58 occurring at the same time, in some embodiments, a delay is introduced by the communication path. However, because the delay is relatively constant over as the vehicle 122 traverses the imaging area 160, the freight dimensioner 130 still receives ticks at the same rate as generated by the encoder 172. Accordingly, any error between the relative timings of the ticks is constant and may be easily corrected by the freight dimensioner 130.

In some embodiments, capturing image data at each tick may be too fast for the freight dimensioner 130 and/or the image sensor 158 to process. Accordingly, as illustrated on the Capture Trigger line 60, the freight dimensioner 130 may be configured to send a capture command to the image sensor 158 after a certain number of ticks occurred (as illustrated, on every three ticks). Said another way, the sample rate at which the image sensor 158 captures image data may be defined in terms of a number of encoder ticks as opposed to set number of seconds. In these embodiments, the image sensor 158 still captures image data at approximately the same time that an encoder tick occurs.

Figure 5:
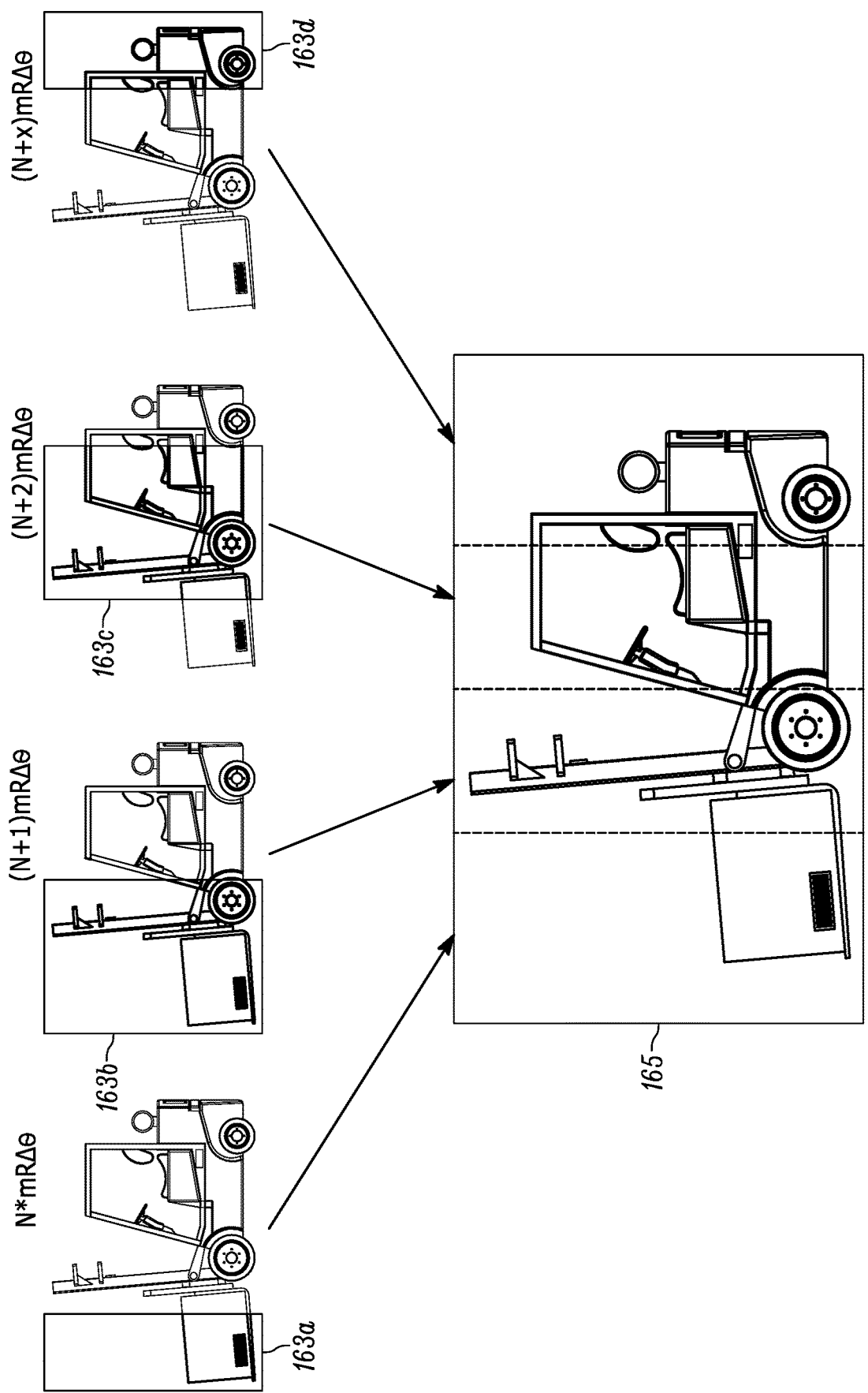
FIG. 5 illustrates an example series of image data captured by an image sensor in the environments of FIG. 1 or 2.

FIG. 5 illustrates an example series of image data 163 captured by an image sensor 158 and the output image 165 resulting from stitching together the series of image data 163. In the illustrated series, the image sensor 158 is utilized in an "incremental" dimensioning system.

In the scenario illustrated in FIG. 5, the image sensor 158 captured in accordance with the Capture Event line of the timing diagram 50. Accordingly, the image sensor 158 may have captured first image data 163a at the first Capture Event tick, second image data 163b at the second Capture Event tick, third image data 163c at the third Capture Event tick, and fourth image data 163d at the fourth Capture Event tick.

To stitch the incrementally captured image data 163 together to produce the output image 165, the freight dimensioner 130 analyzes a distance the vehicle 122 and/or object 124 traveled in the time period between each encoder tick and/or Capture Event tick. As described herein, the following equation may be used to determine the distance the vehicle 122 has traveled:

$$\text{Dist} = (N*m)*R\Delta\Theta \quad \text{(eq. 1)}$$

where:
N is the number of ticks between each Capture Event,
m is a count of the number of Capture Events,
R is the radius of the tire on which the encoder 172 is mounted, and
$\Delta\Theta$ is the angular distance the tire has rotated between each tick, as determined by the encoder 172. In some embodiments, $R\Delta\Theta$ is modified based on a heading of the vehicle 122 to account for any angular deviations caused by the vehicle 122 not moving exactly perpendicular to the image sensor 158.

Figure 6:
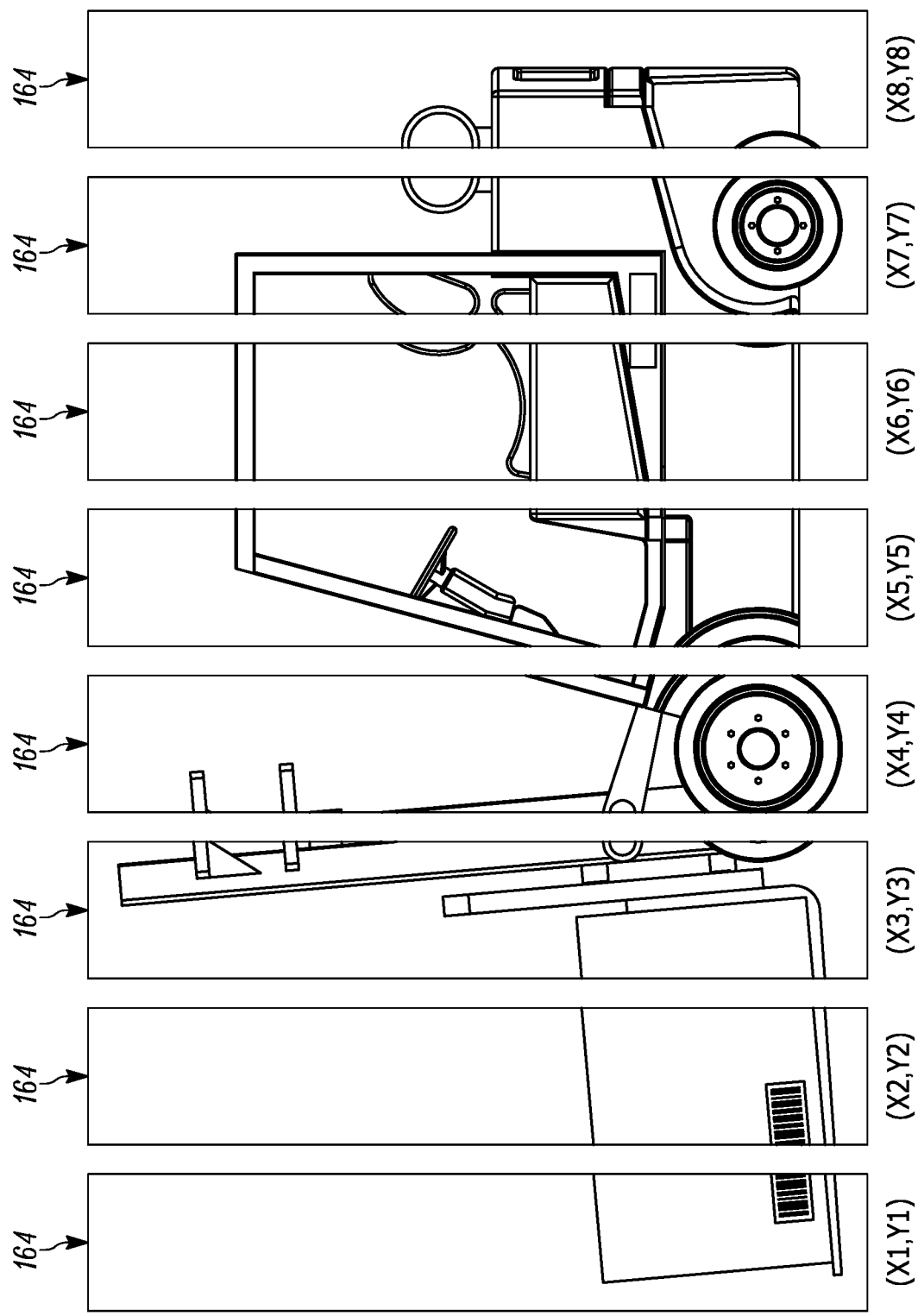
FIG. 6 illustrates an example output image produced by an example "incremental" dimensioning system as implemented by the freight dimensioner 130 of FIG. 1 or 2.

FIG. 6 illustrates an example output image 165 broken down in to segments 164 from different sets of image data 163 captured by the image sensor 158. As described herein, the freight dimensioner 130 knows the location of the vehicle 122 and/or the object 124 when each set of image data is captured by the image sensor 158. Additionally, because the image sensor 158 captures image data periodically based on a number of ticks, the distance the vehicle 122 traversed in both the X-direction and the Y-direction between successive capture events is known. The freight dimensioner 130 identifies common features the vehicle 122 and/or the object 124 across each set of captured image data. The freight dimensioner 130 then divides the identified vehicle 122 and/or object 124 into a fixed number of segments (such as, in the illustrated example, eight). In various embodiments, the freight dimensioner 130 transposes the segments that include common features from different sets of captured data onto one another.

Figure 7:
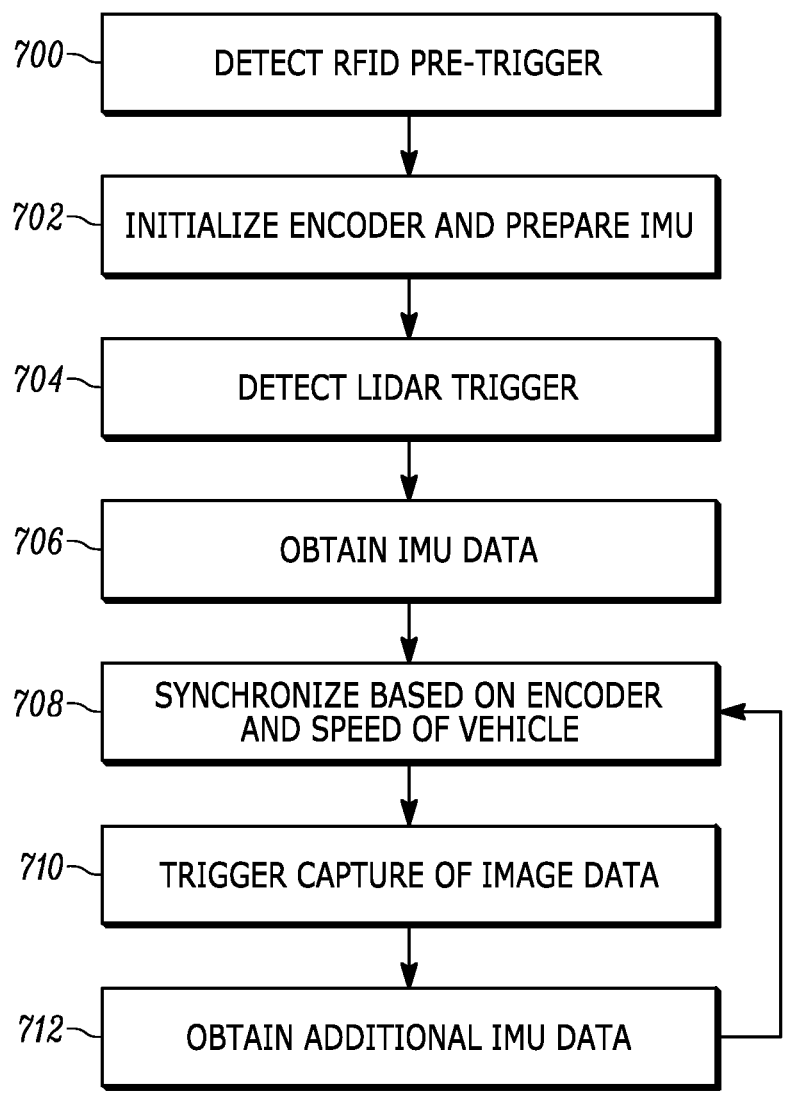
FIG. 7 is a flowchart representative of example operations that may be executed to implement the freight dimensioner 130 in an "incremental" dimensioning system of FIGS. 1 and/or 2.

FIG. 7 is a flowchart representative of example operations that may be executed by, for example, the example freight dimensioner 130 of the "incremental" dimensioning system of FIG. 2.

In the example of FIG. 7, the freight dimensioner 130 detects, from an RFID-based location system, that a vehicle 122 has crossed the example initialization threshold 156 of FIG. 2 (block 700). In response, the freight dimensioner 130 initializes an encoder of a positioning system (i.e., cause the encoder to begin "ticking") by sending instructions to initialize a telematics unit 170 of the vehicle 122 (block 702). For example, the instruction may cause the telematics unit 170 to begin reporting data (such as ticks, heading data, pitch, roll, yaw, and so on) generated by the encoder 172 to the freight dimensioner 130.

The freight dimensioner 130 then detects a trigger to begin capturing image data (block 704). For example, as the vehicle 122 continues to move towards the imaging area 160, the LIDAR laser beam 177 strikes a LIDAR trigger bar 178 that indicates vehicle 122 has entered the imaging area 160. In response, the freight dimensioner 130 obtains and analyzes data generated by the encoder 172 of the vehicle 122 (block 706).

In the illustrated example, the freight dimensioner 130 then executes an image data capture cycle. To this end, the freight dimensioner 130 analyzes the speed of the vehicle 122 (as determined by the encoder 172 and the telematics unit 170) to determine a number of encoder ticks to wait between capture of image data (block 708). In some embodiments, the freight dimensioner 130 accesses a speed-to-tick count reference table to determine the number of encoder ticks. When the freight dimensioner 130 detects that the determined number of encoder ticks have occurred, the freight dimensioner 130 triggers the image sensor 158 to capture image data representative of the imaging area 160 and, thus, the vehicle 122 (block 710). The freight dimensioner 130 then obtains additional data from the encoder 172, including heading data (block 712). If the additional IMU data indicates that the speed of the vehicle 122 has changed, the freight dimensioner 130 correspondingly adjusts the number of encoder ticks the freight dimensioner 130 waits before triggering the image sensor 158 to capture the next instance of image data. This cycle continues until the freight dimensioner 130 receives an indication to terminate the data capture cycle, such as an RFID or LIDAR based determination that the vehicle 122 has left the imaging area 160.

It should be appreciated that in some embodiments, the techniques described herein with respect to an "incremental" dimensioning system may be applied to an "all-at-once" dimensioning system. For example, each of the image sensors 112-118 of the "all-at-once" dimensioning system of FIG. 1 may be configured generally as described with respect to the image sensor 158 of the "incremental" dimensioning system of FIG. 2.

Figure 8:
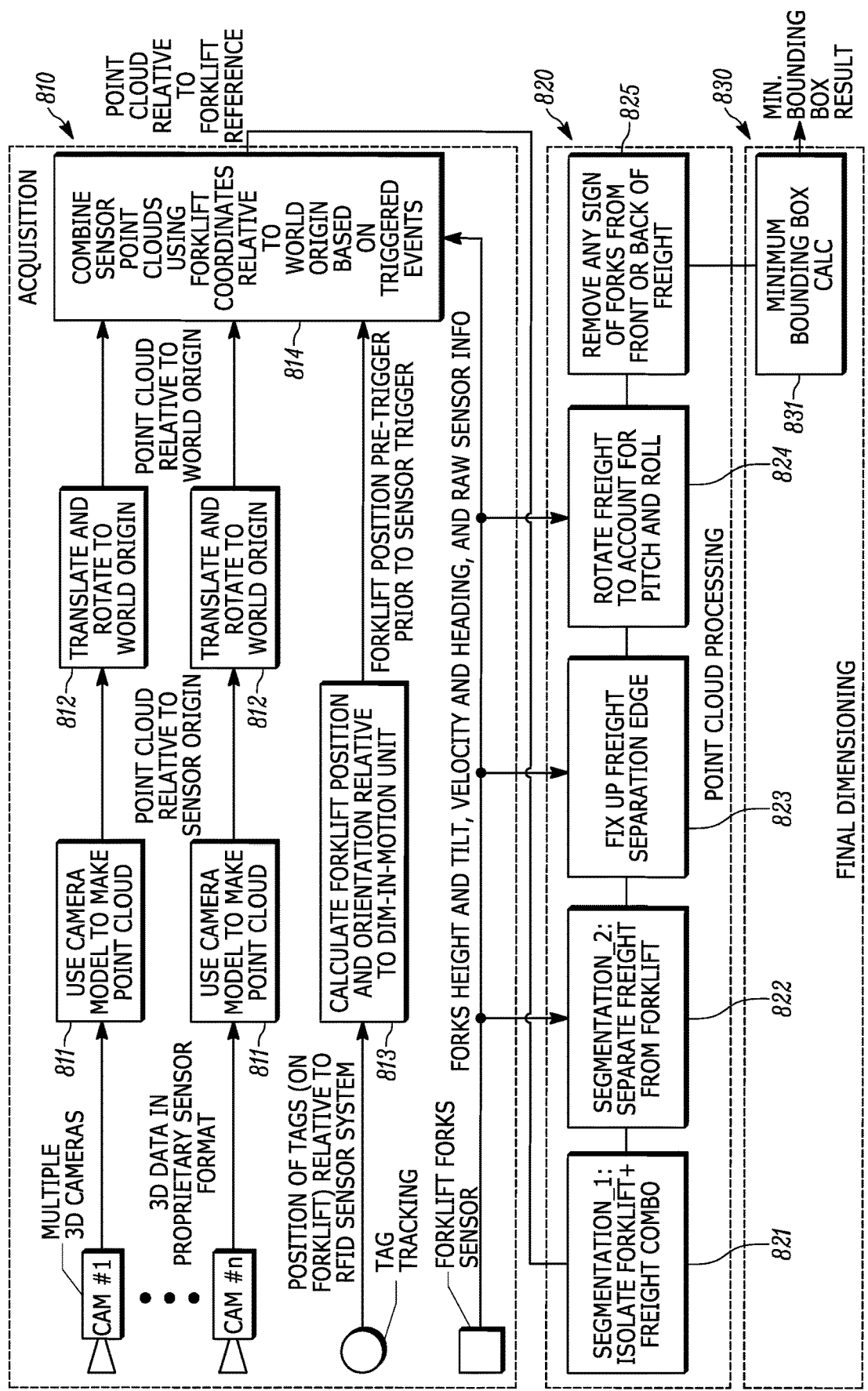
FIG. 8 illustrates an example flow diagram of how image data captured by image sensors are obtained and used to determine the dimensions for an object as implemented by the freight dimensioner 130 of FIG. 1 or 2.

FIG. 8 illustrates an example flow diagram 800 of how image data captured by the image sensor 158 and/or the image sensors 112-118 is obtained and used to determine the dimensions for the object 124 carried by the vehicle 122.

The process begins with the data acquisition phase 810. As illustrated, the data acquisition phase includes obtaining image data from 3D cameras, such as the image sensor 158 and/or the image sensors 112-118, obtaining position data of the object, such as via an RFID-based locationing system and/or a LIDAR-based locationing system, and sensor data generated at the vehicle 122, such as at the telematics unit 170.

Figure 9:
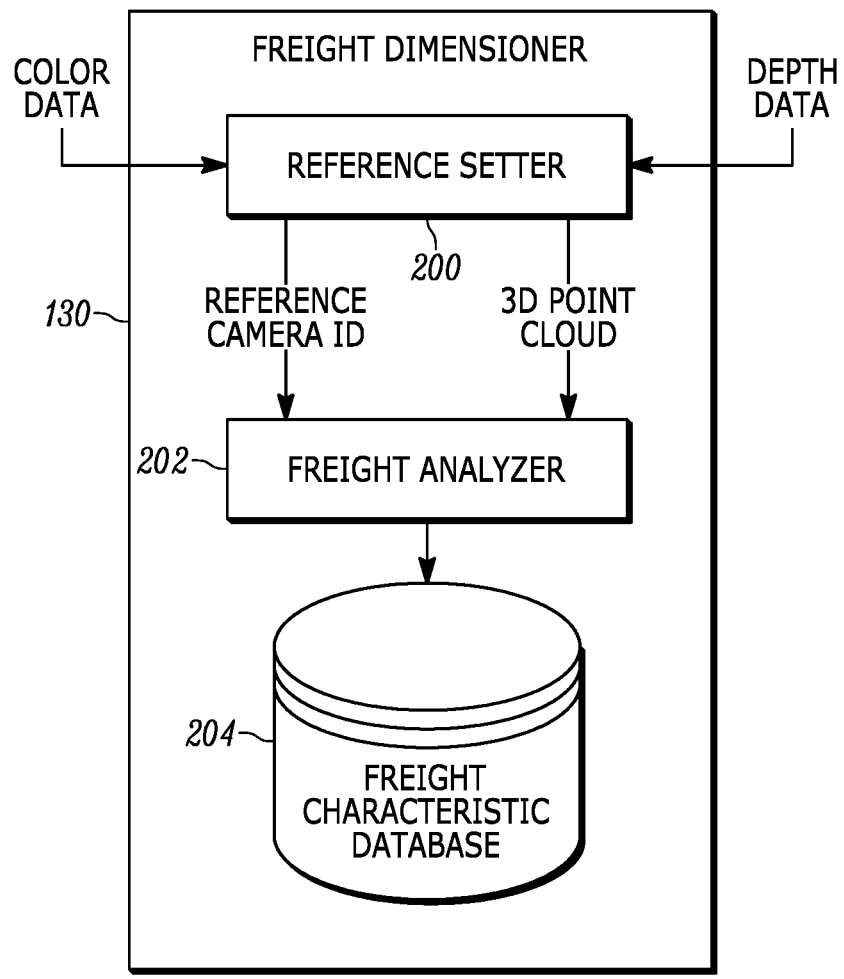
FIG. 9 is a block diagram representative of an example implementation of the freight dimensioner 130 of FIG. 1 or 2.

The process by which the captured image data is converted to a point cloud (block 811) is described in more detail with simultaneous reference to FIG. 9, which is a block diagram representative of an example implementation of the freight dimensioner 130 of FIG. 1 or 2. The example freight dimensioner 130 receives color data and depth data generated by the image sensors 112-118 (Cam #1-#n of FIG. 8). The example freight dimensioner 130 of dimensioning system 100 includes a reference setter 200 to determine which of the image sensors 112-118 is the reference sensor at a particular time and to generate, based on which of the image sensors 112-118 is the reference sensor, a point cloud representative of the vehicle 122 and the object 124 from the different perspectives.

To generate the point cloud representative of the vehicle 122 and the object 124 from different perspectives, the example reference setter 200 transforms color data and depth data generated by the non-reference sensors to the coordinate system of the reference sensor (block 812). The result of the transform performed by the example reference setter 200 is a combined 3D point cloud including color information for the points of the cloud (block 814).

As part of this process, the example freight dimensioner 130 also determines an orientation of the object 124 as it is carried by the vehicle 122. In some embodiments, the vehicle 122 includes one or more sensors proximate to the location of the object 124. These example sensors sense the roll, pitch, and yaw of the object 124. Based on the sensor data, the freight dimensioner 130 may, for example, determine whether an elongated object is oriented lengthwise across the face of the vehicle 122 or lengthwise towards the face of the vehicle 122.

At the point cloud processing phase 820, the freight dimensioner 130 processes the combined point cloud by identifying and segmenting clusters within the combined point cloud. To this end, the example reference setter 200 provides the 3D point cloud and a reference camera identifier (ID) indicative of which of the image sensors 114 to a freight analyzer 202. The example freight analyzer 202 of FIG. 9 clusters points in the 3D point cloud and uses the depth data of the 3D point cloud to determine which one of the clusters is nearest to the reference sensor (e.g., the west image sensor 114 in the example scenario shown in FIG. 1). In some embodiments, the freight analyzer 202 utilizes the determined orientation of the object 124 to identify a cluster that corresponds to the object 124. The example freight analyzer 202 of FIG. 9 identifies the cluster nearest the reference sensor as the object 124. The example freight analyzer 202 uses the identified cluster to segment the object 124 from other elements. For example, the freight analyzer 202 deletes clusters corresponding to the vehicle 122 and clusters corresponding to a person in the vehicle 122. The segmentation of a point cloud is described in more detail in U.S. patent application Ser. No. 15/242,126, filed Aug. 19, 2016, the entire disclosure of which is hereby incorporated by reference.

At the final dimensioning phase 830, the freight dimensioner 130 may determine a minimum bounding box for the cluster corresponding to the object 124 (block 831). It should be appreciated that the object 124 may take any possible shape. Accordingly, the term "box" is not meant to imply a rectangular shape, but merely a bounded three-dimensional object representative of the shape of the object 124. The application of the described "incremental" dimensioning techniques may improve the accuracy at which the bounding box reflects the shape of the object 124. Accordingly, the freight dimensioner 130 may be able to distinguish between a greater number of objects that are carried by a vehicle through a dimensioning zone.

Figure 10:
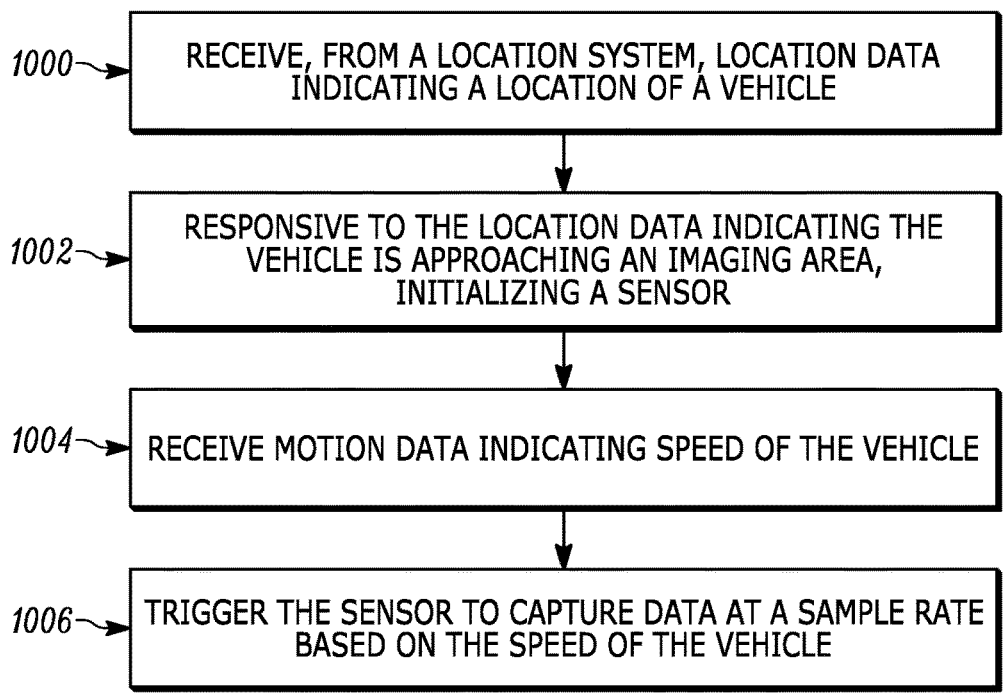
FIG. 10 is a flowchart representative of example operations that may be executed to implement the freight dimensioner 130 in an "incremental" dimensioning system of FIGS. 1 and/or 2.

FIG. 10 is a flowchart representative of example operations that may be executed to implement the freight dimensioner 130 of FIGS. 1 and/or 2 in an "incremental" dimensioning system. As described herein, a location system, such as an RFID-based system and/or a LIDAR location system tracks a location of the vehicle 122 and/or the object 124. In the example of FIG. 10, the freight dimensioner 130 receives the location data generated by the location system, including the location data indicative of the location of the vehicle 122 (block 1000). The freight dimensioner 130 determines whether the vehicle 122 is approaching the imaging area 160. For example, the location data received by the freight dimensioner 130 may indicate that the vehicle 122 has crossed the initialization threshold 156.

Responsive to the freight dimensioner 130 determining that that location data received from the location system indicates that the vehicle 122 is approaching the imaging area 160, the freight dimensioner 130 initializes the image sensor 158 to be primed to capture data indicative of the vehicle 122 and/or the object 124 (block 1002). One example way the freight dimensioner 130 initializes the image sensor 158 is to set a sample rate at which the image sensor 158 will capture the data indicative of the vehicle 122 and/or the object 124. Accordingly, the freight dimensioner 130 may generate an instruction for the encoder 172 to report motion data, such as ticks, corresponding to the vehicle 122. The freight dimensioner 130 transmits the instruction over a wireless network (such as a Wi-Fi network, an LTE network, or any other known wireless communication network) to the telematics unit 170 affixed to the vehicle 122. It should be appreciated that by receiving the motion data responsive to the transmitted instruction reduces volume of data transmitted over the communication networks and helps mitigate issues caused by overloading the freight dimensioner 130 with too much data.

Subsequently, the freight dimensioner 130 receives the motion data from the telematics unit 170 (block 1004). The freight dimensioner 130 may receive the motion data over the same or different wireless network via which the instruction to report the motion data was sent. The freight dimensioner 130 uses the received motion data to determine a sample rate at which the image sensor 158 will capture data indicative of the vehicle 122 and/or the object 124. As described herein, the sample rate may be based on a number of ticks at an encoder of the freight dimensioner 130 and/or location system. In some embodiments, the freight dimensioner 130 references a speed-to-tick count lookup table to determine the number of ticks. In other embodiments, the freight dimensioner 130 determines a processing capacity of the image sensor 158 and/or the freight dimensioner 130. In these embodiments, the freight dimensioner 130 calculates a time period between ticks (e.g., a tick rate). Based on a predetermined relationship between processing capacity and the time to process a set of image data captured by the image sensor 158, the freight dimensioner 130 determines a number of ticks required to process each set of image data. Accordingly, the freight dimensioner 130 triggers the image sensor 158 to capture data representative of the vehicle 122 and/or the object 124 at the determined sample rate (block 1006).

In some examples, the freight dimensioner 130 also generates and transmits other instructions to initialize the image sensor 158. For example, the freight dimensioner 130 may generate and transmit an instruction that causes the image sensor 158 to clear data stored in a buffer associated with the image sensor 158; an instruction that causes the image sensor 158 to allocate memory for storing the data indicative of the vehicle 122 and/or the object 124; an instruction that causes the image sensor 158 to warm up from a standby temperature to an operating temperature and/or switch from a security function to a dimensioning function; and/or an instruction that causes the image sensor 158 to execute a recalibration routine. The freight dimensioner 130 may also cause one or more tasks that are currently being performed by the freight dimensioner 130 to stop in preparation to receive the data captured by the image sensor 158. As an example, the freight dimensioner 130 may include a one or more of graphical processing units (GPUs) each having multiple cores that execute tasks in parallel. Accordingly, to stop the currently-executing tasks, the example freight dimensioner 130 reserves a GPU and/or one or more cores for processing image data captured by image sensor 158. In some embodiments, the freight dimensioner 130 recalculates the number of ticks required to process each set of image data based after reserving the additional processing resources.

In some embodiments, the freight dimensioner 130 receives additional location data of the vehicle 122 and/or the object 124 that indicates the vehicle 122 has exited the imaging area 160. Accordingly, the freight dimensioner 130 generates and transmits an instruction that causes the image sensor 158 to cease capturing data. Additionally, the freight dimensioner 130 generates and transmits an instruction that causes the telematics unit 170 to cease reporting motion data generated by the encoder 172.

Figure 11:
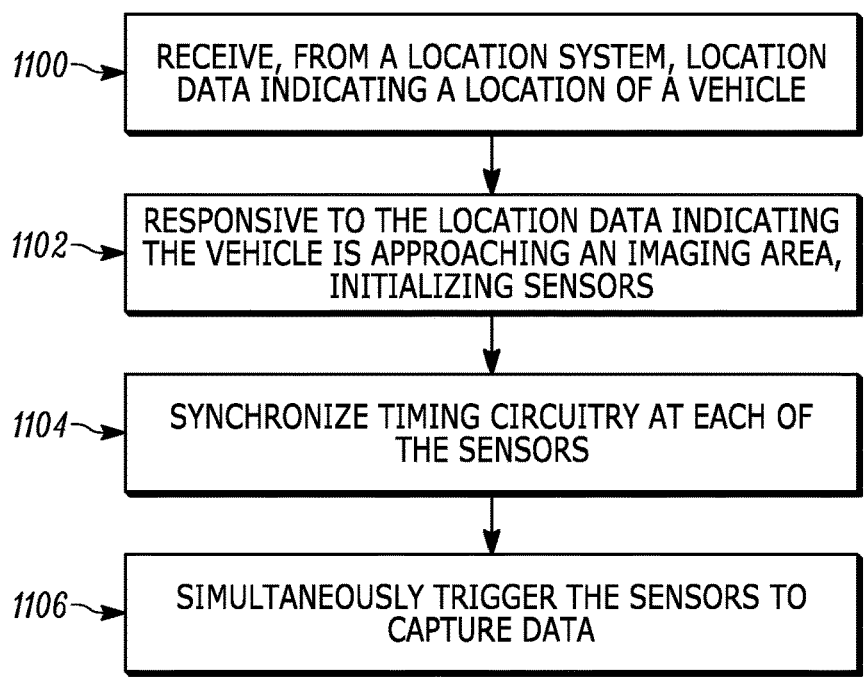
FIG. 11 is a flowchart representative of example operations that may be executed to implement the freight dimensioner 130 in an "all-at-once" dimensioning system of FIGS. 1 and/or 4.

FIG. 11 is a flowchart representative of example operations that may be executed to implement the freight dimensioner 130 of FIGS. 1 and/or 4 in an "all-at-once" dimensioning system. As described herein, a location system, such as an RFID-based system or LIDAR location system tracks a location of the vehicle 122 and/or the object 124. In the example of FIG. 11, the freight dimensioner 130 receives the location data generated by the location system, including the location data indicative of the location of the vehicle 122 (block 1100). The freight dimensioner 130 determines whether the vehicle 122 is approaching the imaging area 120. For example, the location data received by the freight dimensioner 130 may indicate that the vehicle 122 has crossed the initialization threshold 126.

Responsive to the freight dimensioner 130 determining that that location data received from the location system indicates that the vehicle 122 is approaching the imaging area 120, the freight dimensioner 130 initializes the image sensors 112-118 to be primed to capture data indicative of the vehicle 122 and/or the object 124 (block 1102). One example way the freight dimensioner 130 initializes the image sensors 112-118 is to synchronize the image sensors 112-118 based on the speed of the vehicle 122 (block 1104). For example, the freight dimensioner may determine a time at which the vehicle 122 and/or the object 124 will enter the imaging area 120. Accordingly, the freight dimensioner 130 may determine a speed of the vehicle (such as in the manner described with respect to FIG. 10) and distance the vehicle 122 is from the imaging area 120 (as determined by the location system). Accordingly, the freight dimensioner 130 may generate and transmit an instruction that causes each of the image sensors 112-118 to start a timer that expires when the vehicle 122 is predicted to be located at the imaging area 120. As another example, a clock at each of the image sensors 112-118 may be slightly out of synch with one another. Accordingly, the freight dimensioner 130 may generate and transmit an instruction that causes each of the image sensors 112-118 to set a clock to a common time.

Similar to the method described with respect to FIG. 10, the freight dimensioner 130 may also generate and transmit other instructions to prime the image sensor 158 for capturing data. For example, the freight dimensioner 130 generates and transmits an instruction that causes the image sensors 112-118 to clear data stored in a buffer associated with each of the image sensors 112-118; an instruction that causes the image sensors 112-118 to allocate memory for storing the data indicative of the vehicle 122 and/or the object 124; an instruction that causes the image sensors 112-118 to warm up from a standby temperature to an operating temperature; and/or an instruction that causes the image sensors 112-118 to execute a recalibration routine. The freight dimensioner 130 may also cause one or more tasks that are currently being performed by the freight dimensioner 130 to stop in preparation to receive the data captured by the image sensors 112-118. After the vehicle 122 and/or the object 124 is located at the imaging area 120, the freight dimensioner 130 simultaneously causes the image sensors 112-118 to capture data indicative of the vehicle 122 and/or the object 124.

Figure 12:
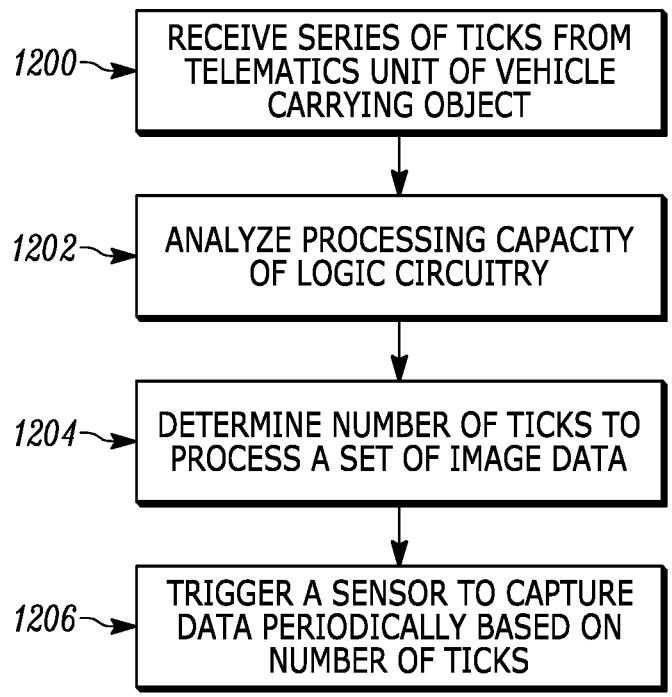
FIG. 12 is a flowchart representative of example operations that may be executed to implement the freight dimensioner 130 in an "incremental" dimensioning system of FIGS. 1 and/or 2.

FIG. 12 is a flowchart representative of example operations that may be executed to implement the freight dimensioner 130 of FIGS. 1 and/or 2 in an "incremental" dimensioning system. As described herein, a location system, such as an RFID-based system and/or a LIDAR location system tracks a location of the vehicle 122 and/or the object 124. In the example of FIG. 12, the freight dimensioner 130 receives a series of ticks from a telematics unit 170 fixedly attached to the vehicle 122 while the vehicle is in an imaging area 160 (block 1200). For example, the freight dimensioner 130 triggers the telematics unit 170 to begin transmitting ticks to the freight dimensioner 130 in response to determining that the vehicle 122 is approaching the imaging area 160. In some embodiments, the telematics unit 170 transmits a tick each time a wheel of the vehicle 122 rotates a predetermined number of degrees. In these embodiments, the tick rate is indicative of the speed of the vehicle 122.

The freight dimensioner 130 then analyzes, using logic circuitry, a processing capacity of the logic circuitry for processing image data (block 1202). In various embodiments, processing image data involves receiving a set of image data from a sensor 158 and storing the set of image data in an appropriate location for analysis when applying the disclosed dimensioning techniques. In some embodiments, to avoid lower accuracy dimensioning caused by data loss, the example freight dimension 130 completes the processing of a first set of image data prior to receiving a second set of image data.

The example logic circuitry includes one or more processing units (e.g., GPUs, CPUs, and so on) that may each have multiple cores. Each processing unit or core thereof is associated with a known processing capacity. Accordingly, the freight dimensioner 130 determines a number of processing units available to process set of image data and, using known techniques, determines a processing capacity of the available processing units or cores thereof Based on the processing capacity, the fright dimensioner 130 determines, using the logic circuitry, a number of ticks required to process a set of image data (block 1204). To this end, the freight dimension 130 analyzes one or more properties associated with the sensor 158. For example, freight dimension 130 may determine an image resolution for captured sets of image data to estimate an amount of processing required to process the set of image data or determine an amount of processing required to process a previously received set of image data. Accordingly, the freight dimensioner 130 determines an amount of time required to process the set of image data based on the available processing capacity. Based on the determined time, the freight dimensioner 130 calculates a number of ticks that, based on the rate at which the freight dimensioner 130 receives the ticks from the telematics unit 170, provides sufficient time to process a set of image data.

Additionally, in some embodiments, the freight dimensioner 130 may reserve additional processing resources to improve the rate at which the freight dimensioner 130 processes image data. As a result, the freight dimensioner 130 can process a set of image data in fewer ticks, thereby enabling the freight dimensioner to receive additional sets of image data while the vehicle 122 is within the imaging area 160. The additional sets of image data improve the accuracy of the disclosed dimensioning techniques. To this end, the freight dimensioner 130 analyzes the logic circuitry to identify processing units or cores thereof performing tasks other than processing a set of image data and causes one or more of the processing units or cores thereof to cease the performance of the task and be reserved for processing a set of image data. After reserving additional processing resources, the freight dimensioner 130 recalculates the number of ticks required to process a set of image data based on the additionally reserved processing units or cores thereof.

In some embodiments, the sensor 158 has a maximum rate at which the sensor 158 can capture a set of image data. To this end, if the number of ticks is sufficiently low, the capture rate of the sensor 158 limits the rate at which sets of image data can be processed. At this point, reserving additional processing resources may not improve the rate at which the freight dimensioner 130 processes the set of image data.

Accordingly, when the freight dimensioner 130 sets the number of ticks, the freight dimensioner 130 ensures that the time between trigger events is higher than the time the sensor 158 needs to capture and transmit a set of image data.

After determining the number of ticks, the freight dimensioner 130 triggers, using the logic circuitry, the sensor 158 to capture data representative of the object periodically based on the determined number of ticks (block 1206). In other words, the freight dimensioner 130 maintains a tick count that resets each time the freight dimensioner 130 triggers the sensor 158. When the tick count reaches the determined number of ticks, the freight dimensioner 130 triggers the sensor 158 to capture the set of image data.

In some embodiments, the vehicle 122 does not traverse the imaging area 160 at a constant speed. Because the tick rate is based on the speed of the vehicle 122, the rate at which the freight dimensioner 130 receives the ticks within the series of ticks also changes. Thus, when the freight dimensioner 130 determines that the tick rate has changed, the freight dimensioner 130 recalculates the number of ticks required to process a set of image data based on the updated tick rate.

Figure 13:
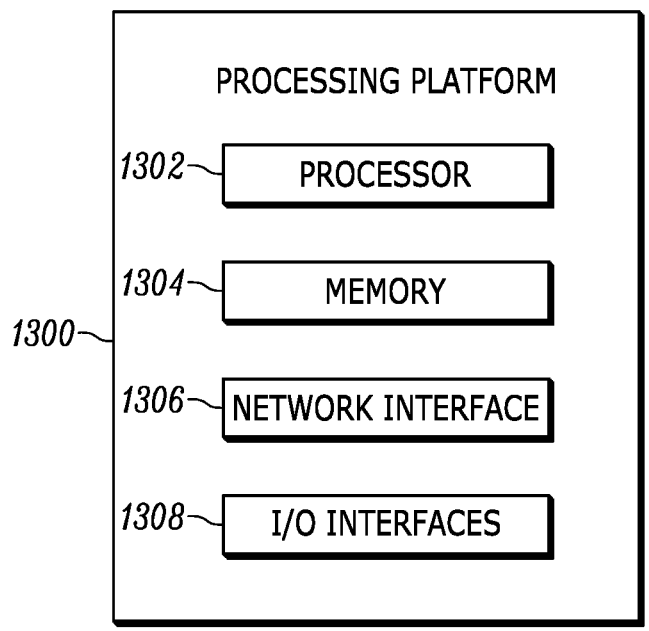
FIG. 13 is a block diagram of an example logic circuit capable of executing the example operations of FIG. 7, 10 or 11 to implement the example freight dimensioner of FIGS. 1, 2, and/or 4.

FIG. 13 is a block diagram representative of an example logic circuit that may be utilized to implement, for example, the freight dimensioner 130 of FIGS. 1, 2 and/or 4. The example logic circuit of FIG. 13 is a processing platform 1300 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 1300 of FIG. 13 includes a processor 1302 such as, for example, one or more microprocessors, controllers, and/or any suitable type of processor. In some embodiments, the processor 1302 is one or more GPUs that each have multiple cores capable of performing tasks in parallel with one another. The example processing platform 1300 of FIG. 13 includes memory (e.g., volatile memory, non-volatile memory) 1304 accessible by the processor 1302 (e.g., via a memory controller). The example processor 1302 interacts with the memory 1304 to obtain, for example, machine-readable instructions stored in the memory 1304 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1300 to provide access to the machine-readable instructions stored thereon.

The example processing platform 1300 of FIG. 13 includes a network interface 1306 to enable communication with other machines via, for example, one or more networks. The example network interface 1306 includes any suitable type of communication interface(s) (e.g., wired and/or wireless interfaces) configured to operate in accordance with any suitable protocol(s).

The example processing platform 1300 of FIG. 13 includes input/output (I/O) interfaces 1308 to enable receipt of user input and communication of output data to the user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, from a location system, location data indicating a location of a vehicle carrying an object;
responsive to the location data indicating that the vehicle is approaching an imaging area, initializing, using a logic circuit, a sensor to be primed for capturing data representative of the object;
receiving, from a motion detector carried by the vehicle, motion data indicating a speed of the vehicle; and
triggering, using the logic circuitry, the sensor to capture data representative of the object at a sample rate based on the speed of the vehicle.

2. The method of claim 1, wherein initializing the sensor comprises:
transmitting, to the sensor, an instruction to clear data stored in a buffer associated with the sensors.

3. The method of claim 1, wherein initializing the sensor comprises:
transmitting, to the sensor, an instruction to allocate memory for storing the captured data.

4. The method of claim 1, wherein the sensor is a three dimensional sensor configured to generate depth values at each of a plurality of coordinates.

5. The method of claim 1, wherein initializing the sensor comprises:
transmitting, to the sensor, an instruction to warm up from a standby temperature to an operating temperature.

6. The method of claim 1, further comprising:
transmitting, to an inertial motion unit (IMU) at the vehicle, an instruction to report the motion data.

7. The method of claim 6, further comprising:
analyzing, using the logic circuitry, the motion data to determine the sample rate based on the speed of the vehicle and a processing capacity of the logic circuitry or the sensor.

8. The method of claim 1, wherein initializing sensor comprises:
transmitting, to the sensor, an instruction to execute a recalibration routine.

9. The method of claim 1, further comprising:
responsive to receiving the location data, causing, using the logic circuitry, a server to stop performing a task in preparation to receive the captured data.

10. The method of claim 1, further comprising:
responsive to receiving, from the location system, additional location data indicating that the object has left the imaging area, ceasing the triggering of the sensor.

11. The method of claim 1, further comprising determining a dimension of the object based on the captured data.

12. A tangible machine-readable medium comprising instructions that, when executed, cause a machine to at least:
receive, from a location system, location data indicating a location of a vehicle carrying an object;

responsive to the location data indicating that the vehicle is approaching an imaging area, initialize a sensor to be primed for capturing data representative of the object;

receive, from a motion detector carried by the vehicle, motion data indicating a speed of the vehicle; and trigger the sensor to capture data representative of the object at a sample rate based on the speed of the vehicle.

13. The tangible machine-readable medium as defined in claim 12, wherein the instructions, when executed, cause the machine to analyze the motion data to determine the sample rate based on the speed of the vehicle and a processing capacity of the machine or the sensor.

* * * * *